(12) United States Patent
Gupta

(10) Patent No.: US 7,774,510 B2
(45) Date of Patent: Aug. 10, 2010

(54) NEAR ZERO OVERHEAD COMMAND TIMEOUT SCHEME

(75) Inventor: Sumit Gupta, Newark, CA (US)

(73) Assignee: Oracle America, Inc., Redwood City, CA (US)

( * ) Notice: Subject to any disclaimer, the term of this patent is extended or adjusted under 35 U.S.C. 154(b) by 246 days.

(21) Appl. No.: 12/131,523

(22) Filed: Jun. 2, 2008

(65) Prior Publication Data

US 2009/0300222 A1    Dec. 3, 2009

(51) Int. Cl.
*G06F 3/00* (2006.01)
*G06F 5/00* (2006.01)

(52) U.S. Cl. .............................. 710/5; 710/36; 710/58; 710/60

(58) Field of Classification Search .................. 710/5, 710/36, 58, 60
See application file for complete search history.

(56) References Cited

U.S. PATENT DOCUMENTS

2006/0221781 A1* 10/2006 Suzuki .................. 369/32.01
2007/0083742 A1* 4/2007 Abernathy et al. ........... 712/244
2008/0117816 A1* 5/2008 Stone et al. ............... 370/230.1
2009/0006689 A1* 1/2009 Lubbers et al. ............. 710/112

* cited by examiner

*Primary Examiner*—Niketa I Patel
*Assistant Examiner*—Zachary K Huson
(74) *Attorney, Agent, or Firm*—Brooks Kushman P.C.

(57) ABSTRACT

A method for handling input/output (I/O) commands in a storage system includes establishing first and second counters for counting unfinished I/O commands, and establishing a reference which is initially set to the first counter. The reference is periodically switched between the first counter and the second counter, and the switching interval is less than the I/O timeout value. Upon placing an I/O command into an I/O command queue, a copy of the current reference is made into an I/O specific control block and the current referenced counter is incremented. Upon finishing of an I/O command, the counter referenced by the I/O specific control block is decremented and the I/O command is removed from the I/O command queue. When switching the reference, a problem is detected in the event that the counter being switched to is above a predetermined threshold. Upon detection of a problem, a more explicit I/O check is conducted.

18 Claims, 3 Drawing Sheets

NEAR ZERO OVERHEAD COMMAND TIMEOUT SCHEME

BACKGROUND OF THE INVENTION

1. Field of the Invention

The invention relates to a command timeout scheme for handling input/output (I/O) commands in an enterprise storage subsystem.

2. Background Art

An enterprise storage subsystem normally handles several I/Os at a given point in time. The ability of the enterprise storage subsystem to scale across different nodes and handle higher workloads depends on how low the overhead of the subsystem is. One of the major elements of the overhead is the work associated with checking if the I/O is flowing in the specified amount of time. If the I/O is stuck or if a node is not responding, the storage subsystem has to take action to abort this I/O.

The storage subsystem receives I/O commands and received commands are placed in a set of queues. Most current implementations for checking if the I/Os are flowing properly involve going through the I/Os queued in the subsystem on a regular interval of a few seconds. Depending upon the system load, this checking may take a long time. Also, during this checking process, the queue has to be locked and new I/Os have to wait which further adds to system complexity and overhead.

Command timeout checking in which a storage driver's I/O queue is, on a regular interval of a few seconds, locked and the I/Os queued are checked does exist in existing storage drivers.

SUMMARY OF THE INVENTION

The contemplated near zero overhead command timeout scheme utilizes the fact that most I/O completes in an interval which is much shorter than the timeout value. For example, the timeout value most commonly used is 60 seconds while an I/O may finish in 1 millisecond. Under normal circumstances, any amount of I/O started at point X in time will finish at point X+dT where dT is a small interval (for example, 5 seconds) and is smaller than the I/O timeout. So, if the I/O started at (or before) point X did not finish at point X+dT then there is a problem and a more explicit checking is needed. In accordance with the invention, until this happens, the typical I/O checking process can be skipped thereby significantly reducing system overhead.

In one embodiment of the invention, two counters are maintained. For illustration, these counters are count_1 and count_2. A reference is maintained to the current counter. Initially, the reference may be set to count_1. All of the I/Os which go into the system queue will make a local copy of this reference into an I/O specific control block.

In this way, the I/O itself is referring to either count_1 or count_2. When an I/O receives the reference, the first thing that the I/O does is to increment the referenced counter. And once the I/O finishes, it decrements that counter. The storage subsystem switches the reference from count_1 to count_2 and vice versa after every 5 seconds. Before doing the switch, the storage system looks at the count of the counter being switched to, to see if it is zero. If the count is non-zero, the storage subsystem knows there is a problem and then starts walking down the I/Os one by one to find out exactly what is the problem. If the count is zero, which it should be 99.99% of the time, then the storage subsystem does not have to do anything.

In accordance with the invention, the real overall work which the system is doing to check the timeouts of all these I/Os is switch a variable every 5 seconds which is almost no overhead at all. A more traditional I/O check need only be performed when a non-zero count is detected in a counter when the reference is about to be switched to that counter.

There are many advantages associated with embodiments of the invention. In particular, the overhead of the I/O command timeout scheme is significantly reduced.

It is to be appreciated that the invention may be implemented in a variety of ways. In general, the invention comprehends the addition of a higher level checking in an input/output (I/O) command timeout scheme for an enterprise storage subsystem. This higher level checking may involve two counters as described above. The current counter may be switched every 5 seconds as described above, or some other interval may be used depending on the implementation. Put another way, the traditional approach to check that I/Os are flowing involves going through the queued I/Os on a regular interval of a few seconds. The invention in an embodiment reduces the overhead by introducing a higher level checking where two counters keep track of unfinished I/Os. When a counter appears stuck at a non-zero value, only then a more explicit checking is required.

DETAILED DESCRIPTION OF THE PREFERRED EMBODIMENT

Figure 1:
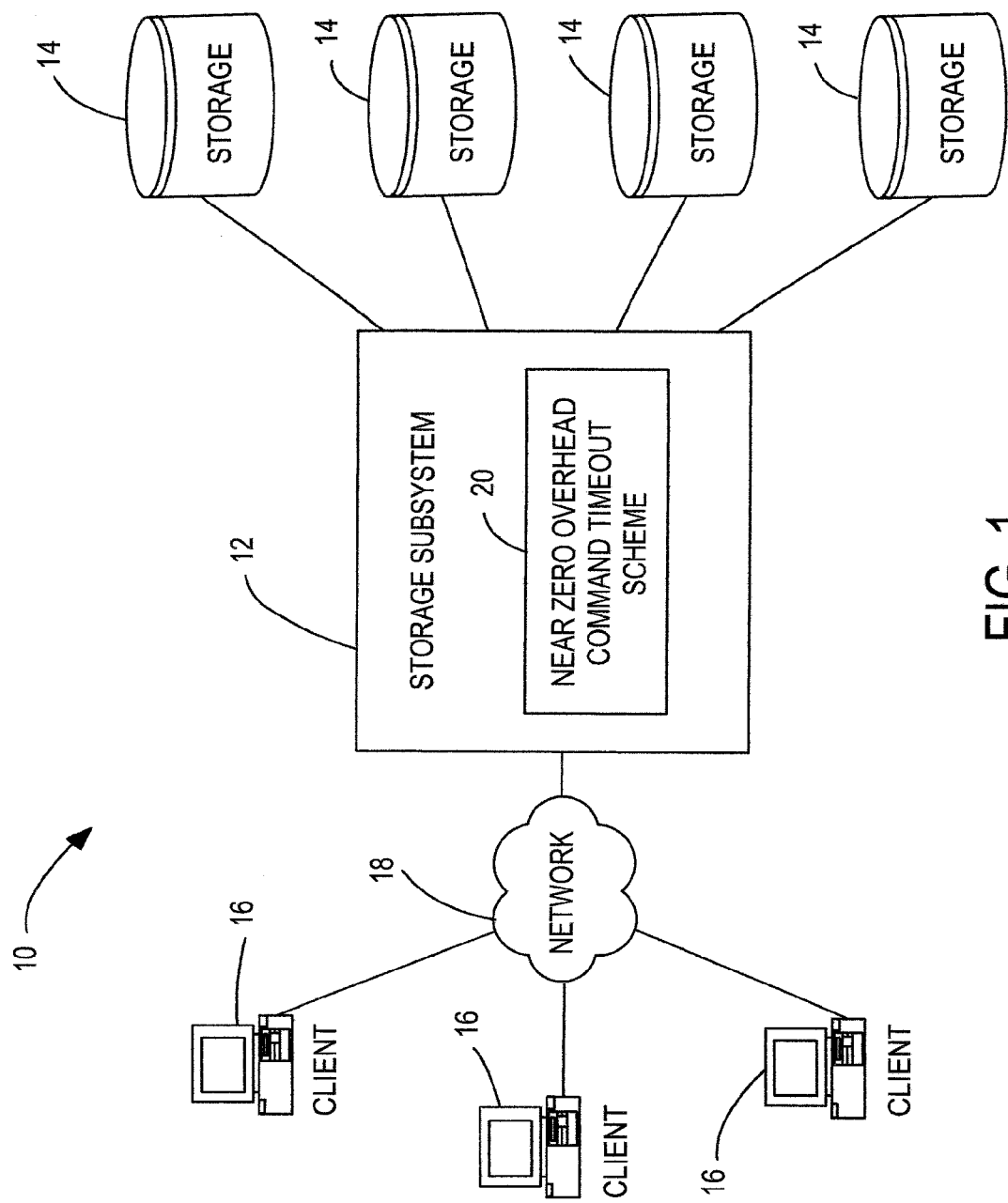
FIG. 1 illustrates a storage subsystem connected to client computers and connected to storage devices, wherein the storage subsystem includes a near zero overhead command timeout scheme in accordance with an embodiment of the invention.

FIGS. 1-4 illustrate embodiments of the invention. It is appreciated that all aspects of the system presented in the drawings are part of the illustrated embodiment of the invention. As such, other implementations are possible for implementing a command timeout scheme in accordance with the invention some of which are described below.

A computer system 10 includes a storage subsystem 12 connected to a plurality of storage devices 14 for reading and writing data in accordance with received commands. Storage subsystem 12 is connected to client computers 16 over network 18 for receiving input/output (I/O) commands and data. Storage subsystem 12 implements a near zero overhead command timeout scheme in accordance with an embodiment of the invention, as depicted at 20. The near zero overhead command timeout scheme checks if I/Os are flowing properly in storage subsystem 12.

In FIG. 1, the storage subsystem 12 may involve any number of computers functioning as nodes or data movers. The client systems 16 may take any suitable form and may implement, for example, command line or graphical user interfaces. The backend storage devices 14 may be composed of any suitable devices such as disk or tape drives. Storage subsystem 12 may separate storage management aspects from data storage aspects with the client systems 16 viewing the storage subsystem 12 as a set of small computer system interface (SCSI) media changer tape libraries and tape drives or other SCSI target devices. Client systems 16 may connect to the storage subsystem 12 over any suitable connection such as a fibre channel (FC) storage area network (SAN). Storage devices 14 may also connect to storage subsystem 12 in any suitable way such as over a fibre channel (FC) storage area network (SAN). One of the client systems may function as an administration system, and accordingly, may connect over a transmission control protocol/Internet protocol (TCP/IP) local area network (LAN) connection.

The storage subsystem 12 may provide a buffer or cache between client systems 16 and backend storage devices 14 via one or more hard disks to improve utilization and throughput. It is appreciated that the concepts of the timeout schemes in embodiments of the invention are generally applicable in a variety of storage system implementations and are not limited to enterprise storage systems.

In one possible implementation, the storage subsystem 12 is composed of node computers interconnected by a mesh network arrangement. Alternatively, the storage subsystem could be a single computer.

Figure 2:
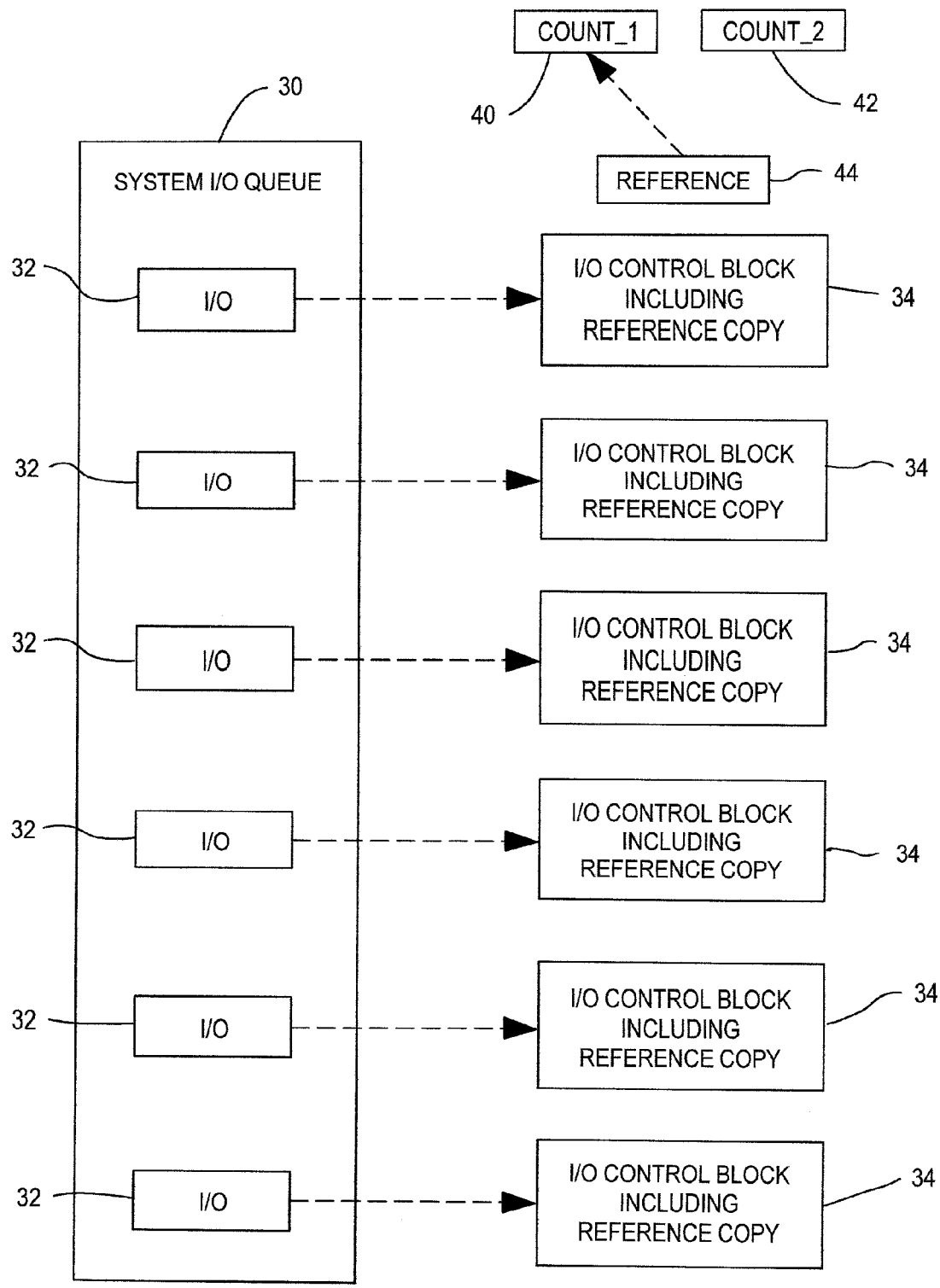
FIG. 2 is a diagram depicting I/Os in the system I/O queue, I/O specific control blocks, two counters, and a reference to the current counter in accordance with an embodiment of the invention.

As shown in FIG. 2, storage subsystem 12 includes a system I/O queue 30. I/O commands received by storage subsystem 12 are placed in the I/O command queue 30. FIG. 2 illustrates several I/Os 32 in the I/O command queue 30. An I/O 32 is removed from the queue 30 when finished. Generally, an I/O timeout value exists for which an I/O 32 is considered to have a problem if the I/O 32 does not finish within the I/O timeout value.

Generally, most I/O completes in an interval which is much shorter than the I/O timeout value. For example, 60 seconds is a common timeout value (timeout values could be at least 60 seconds, at least 30 seconds, or any other appropriate value for the application), while an I/O 32 may finish in one millisecond. In traditional command timeout checking, the I/O queue is, on a regular interval of a few seconds, locked and the I/Os queued are checked. In accordance with the invention, a near zero overhead command timeout scheme is utilized and the typical I/O checking process may be skipped unless a problem is detected that requires an explicit I/O checking.

In an embodiment, two counters are maintained and are illustrated as count_1 at block 40 and count_2 at block 42. A reference 44 is maintained to the current counter. Initially, and as shown, reference 44 may be set to count_1 40. When an I/O 32 is received into the I/O command queue 30, the I/O 32 makes a local copy of the reference 44 into an I/O specific control block 34.

Accordingly, each I/O 32 is referring (via the reference copy in the I/O specific control block 34) to either count_1 40 or count_2 42. When an I/O 32 receives the local copy of the reference 44, the I/O task increments the referenced counter (for example, increments count_1 40). Once an I/O 32 finishes, the finished I/O task decrements the referenced counter.

It is appreciated that the system I/O command queue 30 and other structures shown in FIG. 2 may be implemented, for example, as part of a SCSI driver. The I/Os 32 may be implemented, for example, as kernel threads. Of course, it is appreciated that embodiments of the invention may be implemented in a variety of storage system implementations to increase performance by reducing the overhead associated with checking that the I/O is flowing properly. One application for the invention is in the implementation of an enterprise storage system. Another implementation may be a stand alone network storage device. In general, embodiments of the invention may be utilized in a variety of situations involving I/O command queuing and command timeout checking.

Figure 3:
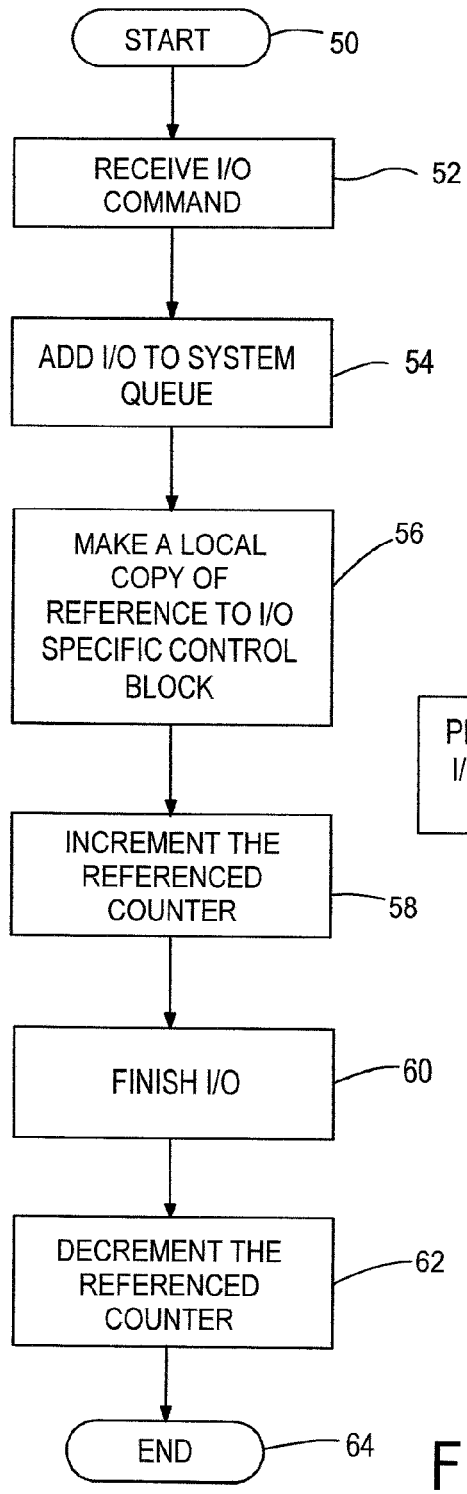
FIG. 3 is a diagram depicting the processing of an I/O in accordance with an embodiment of the invention.

FIG. 3 illustrates the processing of an I/O in an embodiment of the invention. The process starts at block 50. Block 52 indicates receiving an I/O command. For example, a host computer implementing a SCSI target platform in a storage subsystem of a computer network receives I/O commands from client computers on the network. At block 54, the I/O is added to the system I/O command queue. For example, the SCSI driver implementation includes the I/O command queue. The I/Os added to the queue may take the form of kernel threads or other suitable abstractions. As depicted at block 56, the I/O makes a local copy of the reference to the current counter into an I/O specific control block. As shown at block 58, the first thing that the I/O does upon receiving the reference is increment the referenced counter.

Block 60 depicts finishing of the I/O task. Block 62 depicts decrementing of the counter referenced by the corresponding I/O specific control block. Block 64 illustrates the end of the processing of an I/O.

Under normal circumstances, any amount of I/O started at point X in time will finish at point X+dT where dT is a small interval (for example, 5 seconds) and is smaller than the I/O timeout value (for example, 60 seconds). If the I/O started at (or before) point X did not finish at point X+dT, then there is a problem and a more explicit checking is needed. Until this happens, the typical I/O checking process can be skipped thereby significantly reducing system overhead to near zero.

Figure 4:
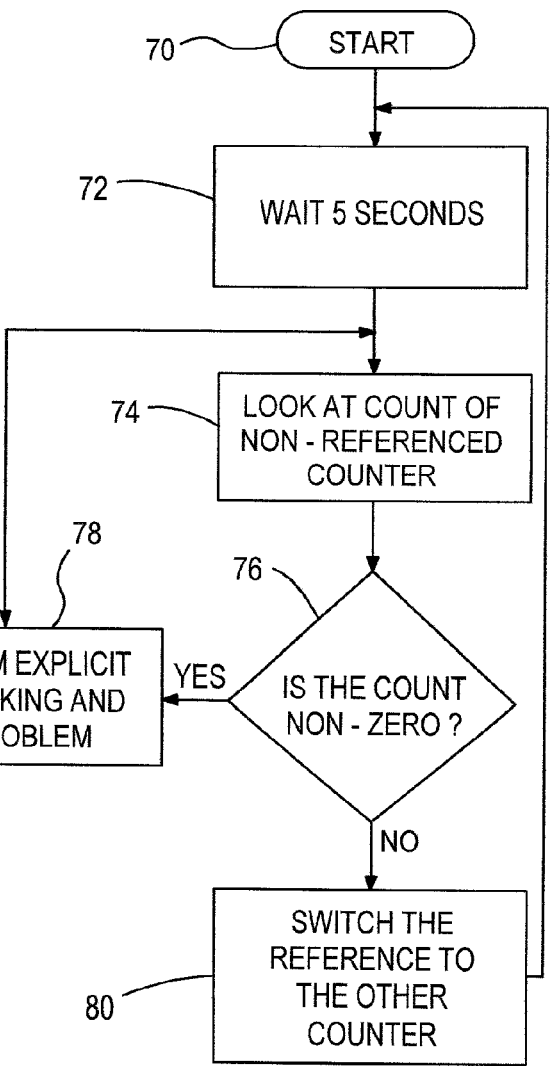
FIG. 4 is a diagram depicting the high level checking using the two counters in accordance with an embodiment of the invention.

In order to check for problems with I/O flow in a manner that has low system overhead, FIG. 4 depicts high level checking using the two counters 40 and 42 in accordance with the illustrated embodiment of the invention. The process starts at block 70. Block 72 indicates waiting for 5 seconds. The storage subsystem switches the reference 44 (FIG. 2) from count_1 40 to count_2 42 (FIG. 2) and vice-versa after every 5 seconds. Of course, other switching intervals are possible (for example, at least 5 seconds, at least 1 second, or any other suitable interval depending on the application).

Before doing the switch, the storage system looks at the count of the counter being switched to (block 74). The storage system is checking to see if the count of the counter being switched to is zero or non-zero, as indicated at block 76. If the count is non-zero (or above some other predetermined threshold appropriate for the application), the storage subsystem knows there is a problem and then starts walking down the I/Os one by one to find out exactly what is the problem (block 78). That is, in an example, when the storage subsystem is about to switch reference 44 (FIG. 2) from one counter to the other counter, the current counter has been the current counter for 5 seconds and the other counter has not been the current counter for the last 5 seconds. Accordingly, if the count of the counter about to be switched to is non-zero, any I/O referencing that counter has been in the I/O queue for 5 seconds (in this example) and should have finished by now. So, any such I/O needs to be checked during a more explicit I/O check. It is appreciated that the more explicit I/O check is a lower level I/O check where I/Os are checked individually in any appropriate way as understood by one of ordinary skill in the art. Further, the more explicit I/O check may include checking at least the I/O commands in the queue wherein the I/O specific control block references the counter which is non-zero.

Otherwise, when the count of the counter about to be switched to is zero, which it should be 99.99% of the time, the storage subsystem does not have to do anything and the reference is switched to the other counter (block 80) and again the system waits 5 seconds (block 72). The storage subsystem does not have to do any additional checking here because in the last 5 seconds, the I/Os that had referenced the counter about to be switched to have all completed and decremented the counter all the way down to zero and no further checking is required.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for handling input/output (I/O) commands in a storage system, the storage system including an I/O command queue, and the storage system receiving I/O commands, wherein an I/O command is placed in the queue when received and is removed from the queue when finished, and wherein an I/O timeout value is established and an I/O is considered to have a problem if the I/O does not finish within the I/O timeout value, the method comprising:
    establishing a first counter for counting unfinished I/O commands;
    establishing a second counter for counting unfinished I/O commands;
    establishing a reference, and initially setting the reference to the first counter;
    periodically switching the reference between the first counter and the second counter, the switching taking place such that a switching interval is less than the I/O timeout value;
    wherein, upon placing the I/O command into the queue, a copy of the current reference is made into an I/O specific control block and the current referenced counter is incremented;
    wherein, upon finishing of the I/O command, the counter referenced by the I/O specific control block is decremented;
    wherein, when switching the reference, the problem is detected in the event that the counter being switched to is above a predetermined threshold; and upon detection of the problem, conducting a more explicit I/O check.

2. The method of claim 1 wherein the I/O timeout value is at least 30 seconds.

3. The method of claim 2 wherein the I/O timeout value is at least 60 seconds.

4. The method of claim 2 wherein the switching interval is at least 1 second.

5. The method of claim 4 wherein the switching interval is at least 5 seconds.

6. The method of claim 1 wherein the reference is switched between only the first counter and the second counter.

7. The method of claim 1 wherein, when switching the reference, the problem is detected in the event that the counter being switched to is non-zero.

8. The method of claim 1 wherein the more explicit I/O check includes checking at least the I/O commands in the queue wherein the I/O specific control block references the counter which is above the predetermined threshold.

9. The method of claim 1 wherein, when switching the reference, the problem is detected in the event that the counter being switched to is non-zero; and wherein the more explicit I/O check includes checking at least the I/O commands in the queue wherein the I/O specific control block references the counter which is non-zero.

10. A system comprising: a data storage system connected to client computers for receiving I/O commands and data, and connected to a plurality of storage devices for reading and writing data in accordance with received commands;
    wherein the data storage system includes an I/O command queue, wherein an I/O command is placed in the queue when received and is removed from the queue when finished, and wherein an I/O timeout value is established and an I/O is considered to have a problem if the I/O does not finish within the I/O timeout value;
    wherein the storage system establishes a first counter for counting unfinished I/O commands, a second counter for counting unfinished I/O commands, and a reference, the storage system initially setting the reference to the first counter;
    wherein the storage system operates to periodically switch the reference between the first counter and the second counter, the switching taking place such that a switching interval is less than the I/O timeout value;
    wherein, upon placing the I/O command into the queue, a copy of the current reference is made into an I/O specific control block and the current referenced counter is incremented;
    wherein, upon finishing of the I/O command, the counter referenced by the I/O specific control block is decremented;
    wherein, when switching the reference, the problem is detected in the event that the counter being switched to is above a predetermined threshold; and upon detection of the problem, conducting a more explicit I/O check.

11. The system of claim 10 wherein the I/O timeout value is at least 30 seconds.

12. The system of claim 11 wherein the I/O timeout value is at least 60 seconds.

13. The system of claim 11 wherein the switching interval is at least 1 second.

14. The system of claim 13 wherein the switching interval is at least 5 seconds.

15. The system of claim 10 wherein the reference is switched between only the first counter and the second counter.

16. The system of claim 10 wherein, when switching the reference, the problem is detected in the event that the counter being switched to is non-zero.

17. The system of claim 10 wherein the more explicit I/O check includes checking at least the I/O commands in the queue wherein the I/O specific control block references the counter which is above the predetermined threshold.

18. The system of claim 10 wherein, when switching the reference, the problem is detected in the event that the counter being switched to is non-zero; and wherein the more explicit I/O check includes checking at least the I/O commands in the queue wherein the I/O specific control block references the counter which is non-zero.

* * * * *